(12) United States Patent
Tao et al.

(10) Patent No.: US 12,149,960 B2
(45) Date of Patent: Nov. 19, 2024

(54) INTERFERENCE SOURCE DETECTION METHOD, APPARATUS, DEVICE, AND SYSTEM, AND STORAGE MEDIUM

(71) Applicant: HUAWEI TECHNOLOGIES CO., LTD., Guangdong (CN)

(72) Inventors: Liang Tao, Nanjing (CN); Dewei Bao, Nanjing (CN); Qikun Wei, Nanjing (CN); Lv Ding, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 294 days.

(21) Appl. No.: 17/695,161

(22) Filed: Mar. 15, 2022

(65) Prior Publication Data

US 2022/0210671 A1 Jun. 30, 2022

Related U.S. Application Data

(63) Continuation of application No. PCT/CN2020/115745, filed on Sep. 17, 2020.

(30) Foreign Application Priority Data

Sep. 17, 2019 (CN) .......................... 201910877896.4

(51) Int. Cl.
*H04W 24/02* (2009.01)
*H04B 17/318* (2015.01)
(Continued)

(52) U.S. Cl.
CPC .......... *H04W 24/02* (2013.01); *H04B 17/318* (2015.01); *H04W 72/0453* (2013.01); *H04W 72/541* (2023.01)

(58) Field of Classification Search
None
See application file for complete search history.

(56) References Cited

U.S. PATENT DOCUMENTS

| 10,299,145 B1 | 5/2019 | Sung et al. |
| 2010/0216463 A1* | 8/2010 | Jalil .................... H04W 64/003 455/434 |

(Continued)

FOREIGN PATENT DOCUMENTS

| CN | 103281762 A | 9/2013 |
| CN | 105979537 A | 9/2016 |

(Continued)

OTHER PUBLICATIONS

Amit Hakoo,Interference Detection and Mitigation with Cisco CleanAir, https://blogs.cisco.com/networking/Interference-detection-and-mitigation-with-cisco-cleanair, Sep. 5, 2013, 9 pages.

(Continued)

*Primary Examiner* — Diane L Lo
(74) *Attorney, Agent, or Firm* — WOMBLE BOND DICKINSON (US) LLP

(57) ABSTRACT

Embodiments of this application disclose an interference source detection method, apparatus, device, and system, and a storage medium. The method includes: obtaining data detected by a plurality of access points (Aps), where data detected by any AP of the plurality of APs includes load information and radio frequency information of the any AP, received signal strength indicator RSSI information between the any AP and a neighbor of the any AP, and load information and radio frequency information of the neighbor of the any AP; determining a global neighbor topology based on the data detected by the plurality of APs; and determining an interference source based on the global neighbor topology.

20 Claims, 7 Drawing Sheets

(51) Int. Cl.
*H04W 72/0453* (2023.01)
*H04W 72/541* (2023.01)

(56) References Cited

U.S. PATENT DOCUMENTS

| | | |
|---|---|---|
| 2019/0014536 A1 | 1/2019 | Desai et al. |
| 2019/0149396 A1* | 5/2019 | Zafer .................. H04L 41/0654 |
| | | 709/224 |
| 2022/0263723 A1* | 8/2022 | Pronk ..................... H04L 41/14 |
| 2023/0080610 A1* | 3/2023 | Zohoorian ............ H04W 64/00 |
| | | 370/329 |

FOREIGN PATENT DOCUMENTS

| | | |
|---|---|---|
| CN | 107919901 A | 4/2018 |
| WO | 2015149858 A1 | 10/2015 |
| WO | 2017222706 A1 | 12/2017 |
| WO | 2018128297 A1 | 7/2018 |

OTHER PUBLICATIONS

Viavi , Case StudyIdentifyingExternalInterferenceat Co-LocatedCell Sites, 2016, 2 pages.

* cited by examiner

INTERFERENCE SOURCE DETECTION METHOD, APPARATUS, DEVICE, AND SYSTEM, AND STORAGE MEDIUM

CROSS-REFERENCE TO RELATED APPLICATIONS

This application is a continuation application of International Patent Application No. PCT/CN2020/115745, filed on Sep. 17, 2020 which claims priority to Chinese Patent Application No. 201910877896.4, filed on Sep. 17, 2019. The disclosures of the aforementioned applications are hereby incorporated by reference in their entireties.

TECHNICAL FIELD

This application relates to the field of communications technologies, and in particular, to an interference source detection method, apparatus, device, and system, and a storage medium.

BACKGROUND

Wireless communications technologies are widely applied because of their features such as a short deployment period, strong natural disaster resistance, and low construction and O&M costs. However, some extranet third-party interference sources exist in a network, and may cause co-channel interference to an intranet access point (AP). Interference from an interference source not only causes a decrease in a signal-to-noise ratio and a throughput and degradation of base station performance, but also results in a higher offline rate, thereby affecting user experience. Therefore, how to detect an interference source becomes increasingly important for improving network performance.

SUMMARY

Embodiments of this application provide an interference source detection method, apparatus, device, and system, and a storage medium, to resolve a problem in a related technology.

According to a first aspect, an interference source detection method is provided. The method includes: obtaining data detected by a plurality of access points APs, where data detected by any AP of the plurality of APs includes load information and radio frequency information of the any AP, received signal strength indicator (RSSI) information between the any AP and a neighbor of the any AP, and load information and radio frequency information of the neighbor of the any AP; determining a global neighbor topology based on the data detected by the plurality of APs; and determining an interference source based on the global neighbor topology.

Data detected by an AP is obtained, and the detected data not only includes RSSI information used to reflect a neighbor relationship, but also includes load information of the AP and a neighbor of the AP. Therefore, after the global neighbor topology is determined based on the data detected by the AP, the interference source determined based on the global neighbor topology is more accurate. This provides a basis for subsequently avoiding the interference source, and can further improve network performance.

In an embodiment, the determining an interference source based on the global neighbor topology includes: distinguishing between an intranet AP and the interference source in the global neighbor topology based on an intranet AP table, to obtain information about the interference source. The intranet AP table may be obtained in advance. The manner of determining the interference source based on the intranet AP table improves interference source detection efficiency.

In an embodiment, after the determining an interference source based on the global neighbor topology, the method further includes: determining a carrying capacity in a current network status based on the global neighbor topology, where the carrying capacity in the current network status is used to indicate a quantity of interference sources that a current network is capable of carrying; and outputting an interference source detection result based on the carrying capacity in the current network status and the information about the interference source.

In an embodiment, the determining a carrying capacity in a current network status based on the global neighbor topology includes: distinguishing between the intranet AP and the interference source in the global neighbor topology based on the intranet AP table, to obtain an intranet AP topology; and determining the carrying capacity in the current network status based on the intranet AP topology.

In an embodiment, the determining the carrying capacity in the current network status based on the intranet AP topology includes: searching for a maximum complete subgraph in the intranet AP topology; and calculating a minimum carrying capacity corresponding to the maximum complete subgraph, and using the minimum carrying capacity corresponding to the maximum complete subgraph as the carrying capacity in the current network status.

In an embodiment, the calculating a minimum carrying capacity corresponding to the maximum complete subgraph includes: determining, by using the following formula, the minimum carrying capacity $M_{min}$ corresponding to the maximum complete subgraph:

$$M_{min} = M - K_1, \text{ where}$$

M is a quantity of available channels in the current network, and $K_1$ is a degree of the maximum complete subgraph.

In an embodiment, the determining the carrying capacity in the current network status based on the intranet AP topology includes: searching for a maximum complete subgraph in the intranet AP topology; removing a found maximum complete subgraph from the intranet AP topology, and then continuing to search for a maximum complete subgraph in the current topology, and so on, until a dimension of a found maximum complete subgraph is a reference dimension; and determining a theoretical maximum carrying capacity based on a quantity of found maximum complete subgraphs and a minimum carrying capacity corresponding to each maximum complete subgraph, and using the theoretical maximum carrying capacity as the carrying capacity in the current network status.

In an embodiment, the determining a theoretical maximum carrying capacity based on a quantity of found maximum complete subgraphs and a minimum carrying capacity corresponding to each maximum complete subgraph includes: determining, by using the following formula, the theoretical maximum carrying capacity $M_{max}$ based on the quantity of found maximum complete subgraphs and the minimum carrying capacity corresponding to each maximum complete subgraph:

$$M_{max} = \Sigma_{i=1}^{n}[M - K_i], \text{ where}$$

M is a quantity of available channels in the current network, n is the quantity of found maximum complete subgraphs, and $K_i$ is a degree of the $i^{th}$ maximum complete subgraph.

In an embodiment, the outputting an interference source detection result based on the carrying capacity in the current network status and the information about the interference source includes: for any interference source, determining, based on information about the any interference source, whether the any interference source is avoidable; and outputting the information about the interference source, information about an avoidable interference source, and the carrying capacity in the current network status as the interference source detection result. The information about the interference source, the information about the avoidable interference source, and the carrying capacity in the current network status are output as the interference source detection result, and may be displayed to a user, and the user determines, based on the interference source detection result, interference sources to be removed, thereby providing assurance for quickly responding to an interference source problem.

In an embodiment, in addition to outputting the information about the interference source, the information about the avoidable interference source, and the carrying capacity in the current network status as the interference source detection result, the information about the interference source, information about an unavoidable interference source, and the carrying capacity in the current network status may be output as the interference source detection result. Once the information about the unavoidable interference source is known, the information about the avoidable interference source is also known if information about all interference sources is known.

In an embodiment, the outputting the information about the interference source, information about an avoidable interference source, and the carrying capacity in the current network status as the interference source detection result includes: sorting interference sources based on interference degrees of the interference sources; and outputting the information about the interference source, the information about the avoidable interference source, and the carrying capacity in the current network status based on a sorting result. Because the interference degrees of the interference sources may indicate hazard degrees of the interference sources, the interference sources may be sorted based on the interference degrees to play a reminder function, so that efficiency for subsequently responding to an interference source problem can be improved.

In an embodiment, the outputting an interference source detection result based on the carrying capacity in the current network status and the information about the interference source includes: for any interference source, determining, based on information about the any interference source, whether the any interference source is avoidable; and sorting interference sources based on interference degrees of the interference sources, determining a target avoidable interference source in the sorted interference sources based on the carrying capacity in the current network status, and outputting information about the target avoidable interference source as the interference source detection result. After the interference sources are sorted based on the interference degrees, the target avoidable interference source is determined based on the carrying capacity, and the information about the target avoidable interference source is output as the interference source detection result, without manual selection, thereby improving interference source avoidance efficiency.

In an embodiment, in addition to outputting the information about the target avoidable interference source as the interference source detection result, information about a target unavoidable interference source may be alternatively output as the interference source detection result. If the information about the target avoidable interference source is known, the information about the target unavoidable interference source may also be known.

In an embodiment, before the sorting interference sources based on interference degrees of the interference sources, the method further includes: for any interference source $X_i$, calculating an interference degree $D_i$ of the any interference source based on a load of the any interference source and an impact domain of the any interference source by using the following formula:

$$D_i = \Sigma_j \min\{\text{Load}(X_i), \text{Load}(B_{i,j})\}, \text{ where}$$

Load($X_i$) is the load of the any interference source $X_i$, and Load($B_{i,j}$) is a load of $B_{i,j}$ in the impact domain of the any interference source $X_i$.

In an embodiment, before the sorting interference sources based on interference degrees of the interference sources, the method further includes: for any interference source, determining, among intranet APs, a neighboring intranet AP of the any interference source, to obtain a neighboring AP set; and determining, among the intranet APs, a neighbor of each AP in the neighboring AP set, and combining the neighbor of each AP in the neighboring AP set into the neighboring AP set, to obtain the impact domain of the any interference source.

In an embodiment, the determining, based on information about the any interference source, whether the any interference source is avoidable includes: determining an allocatable channel set of a network neighbor of the any interference source based on the information about the any interference source; sequentially allocating channels in a local topology based on the channel set, where the local topology includes the any interference source and the network neighbor of the any interference source; and determining, based on each channel allocation result, whether the any interference source is avoidable.

In an embodiment, after the determining a carrying capacity in a current network status based on the global neighbor topology, the method further includes: when a quantity of all interference sources is less than the carrying capacity in the current network status, allocating a radio frequency resource to an intranet AP in the global topology based on the information about the interference source. That the quantity of all interference sources is less than the carrying capacity in the current network status means that the quantity of all interference sources falls within a range of the quantity of interference sources that the current network is capable of carrying. Therefore, the interference source may not be removed. However, to reduce interference from the interference source, the interference source may be avoided when a radio frequency resource is allocated. In this way, a more harmful interference source is preferentially avoided in limited radio frequency resources such as channels and bandwidth, thereby improving overall network quality.

In an embodiment, when the quantity of all interference sources is greater than the carrying capacity in the current network status, a manner of manually removing the interference source may be recommended, to avoid a problem caused by the interference source.

In an embodiment, the allocating a radio frequency resource to an intranet AP in the global topology based on the information about the interference source includes: calculating a quantity of neighbors of each intranet AP; performing weighted averaging based on a load of each intranet AP and the quantity of neighbors of each intranet AP, to obtain a priority of the intranet AP; and performing radio frequency resource allocation based on the information about the interference source and the priority of the intranet AP. The APs are re-sorted based on loads and neighbor information of the APs, and radio frequency resource allocation is performed based on a sorting result, so that interference can be further reduced.

According to a second aspect, an interference source detection apparatus is provided. The apparatus includes:

an obtaining module, configured to obtain data detected by a plurality of access points APs, where data detected by any AP of the plurality of APs includes load information and radio frequency information of the any AP, received signal strength indicator RSSI information between the any AP and a neighbor of the any AP, and load information and radio frequency information of the neighbor of the any AP; and a detection module, configured to determine a global neighbor topology based on the data detected by the plurality of APs, and determine an interference source based on the global neighbor topology.

In an embodiment, the detection module is configured to distinguish between an intranet AP and the interference source in the global neighbor topology based on an intranet AP table, to obtain information about the interference source.

In an embodiment, the detection module is further configured to: determine a carrying capacity in a current network status based on the global neighbor topology, where the carrying capacity in the current network status is used to indicate a quantity of interference sources that a current network is capable of carrying; and output an interference source detection result based on the carrying capacity in the current network status and the information about the interference source.

In an embodiment, the detection module is configured to: distinguish between the intranet AP and the interference source in the global neighbor topology based on the intranet AP table, to obtain an intranet AP topology; and determine the carrying capacity in the current network status based on the intranet AP topology.

In an embodiment, the detection module is configured to: search for a maximum complete subgraph in the intranet AP topology; and calculate a minimum carrying capacity corresponding to the maximum complete subgraph, and use the minimum carrying capacity corresponding to the maximum complete subgraph as the carrying capacity in the current network status.

In an embodiment, the detection module is configured to determine, by using the following formula, the minimum carrying capacity $M_{min}$ corresponding to the maximum complete subgraph:

$$M_{min}=M-K_1, \text{ where}$$

M is a quantity of available channels in the current network, and $K_1$ is a degree of the maximum complete subgraph.

In an embodiment, the detection module is configured to: search for a maximum complete subgraph in the intranet AP topology; remove a found maximum complete subgraph from the intranet AP topology, and then continue to search for a maximum complete subgraph in the current topology, and so on, until a dimension of a found maximum complete subgraph is a reference dimension; and determine a theoretical maximum carrying capacity based on a quantity of found maximum complete subgraphs and a minimum carrying capacity corresponding to each maximum complete subgraph, and use the theoretical maximum carrying capacity as the carrying capacity in the current network status.

In an embodiment, the detection module is configured to determine, by using the following formula, the theoretical maximum carrying capacity $M_{max}$ based on the quantity of found maximum complete subgraphs and the minimum carrying capacity corresponding to each maximum complete subgraph:

$$M_{max}=\Sigma_{i=1}^{n}[M-K_i], \text{ where}$$

M is a quantity of available channels in the current network, n is the quantity of found maximum complete subgraphs, and $K_i$ is a degree of the $i^{th}$ maximum complete subgraph.

In an embodiment, the detection module is configured to: for any interference source, determine, based on information about the any interference source, whether the any interference source is avoidable; and output the information about the interference source, information about an avoidable interference source, and the carrying capacity in the current network status as the interference source detection result.

In an embodiment, the detection module is configured to: sort interference sources based on interference degrees of the interference sources; and output the information about the interference source, the information about the avoidable interference source, and the carrying capacity in the current network status based on a sorting result.

In an embodiment, the detection module is configured to: for any interference source, determine, based on information about the any interference source, whether the any interference source is avoidable; and sort interference sources based on interference degrees of the interference sources, determine a target avoidable interference source in the sorted interference sources based on the carrying capacity in the current network status, and output information about the target avoidable interference source as the interference source detection result.

In an embodiment, the detection module is further configured to: for any interference source $X_i$, calculate an interference degree $D_i$ of the any interference source based on a load of the any interference source and an impact domain of the any interference source by using the following formula:

$$D_i=\Sigma_j \min\{\text{Load}(X_i),\text{Load}(B_{i,j})\}, \text{ where}$$

$\text{Load}(X_i)$ is the load of the any interference source $X_i$, and $\text{Load}(B_{i,j})$ is a load of $B_{i,j}$ in the impact domain of the any interference source $X_i$.

In an embodiment, the detection module is further configured to: for any interference source, determine, among intranet APs, a neighboring intranet AP of the any interference source, to obtain a neighboring AP set; and determine, among the intranet APs, a neighbor of each AP in the neighboring AP set, and combine the neighbor of each AP in the neighboring AP set into the neighboring AP set, to obtain the impact domain of the any interference source.

In an embodiment, the detection module is configured to: determine an allocatable channel set of a network neighbor of the any interference source based on the information about the any interference source; sequentially allocate channels in a local topology based on the channel set, where the local topology includes the any interference source and the network neighbor of the any interference source; and determine, based on each channel allocation result, whether the any interference source is avoidable.

In an embodiment, the apparatus further includes an allocation module, configured to: when a quantity of all interference sources is less than the carrying capacity in the current network status, allocate a radio frequency resource to an intranet AP in the global topology based on the information about the interference source.

In an embodiment, the allocation module is configured to: calculate a quantity of neighbors of each intranet AP; perform weighted averaging based on a load of each intranet AP and the quantity of neighbors of each intranet AP, to obtain a priority of the intranet AP; and perform radio frequency resource allocation based on the information about the interference source and the priority of the intranet AP.

According to a third aspect, an interference source detection system is provided. The system includes a plurality of access points APs and a detection device.

The plurality of APs are configured to report data detected by the plurality of APs. The detection device is configured to detect an interference source according to the method according to any one of the implementations of the first aspect.

According to a fourth aspect, this application provides a network device, to perform the method according to any one of the first aspect or the possible implementations of the first aspect. Specifically, the network device includes a unit configured to perform the method according to any one of the first aspect or the possible implementations of the first aspect.

According to a fifth aspect, this application provides a network device. The network device includes a processor, a network interface, and a memory. The network interface may be a transceiver. The memory may be configured to store program code, and the processor is configured to invoke the program code in the memory to perform the method according to any one of the first aspect or the possible implementations of the first aspect. Details are not described herein again.

According to a sixth aspect, this application provides a computer-readable storage medium, where the computer-readable storage medium stores instructions. When the instructions are run on a computer, the computer is enabled to perform the method according to any one of the first aspect or the possible implementations of the first aspect.

According to a seventh aspect, this application provides a computer program product including computer program instructions. When the computer program product runs on a network device, the network device is enabled to perform the method according to any one of the first aspect or the possible implementations of the first aspect.

According to an eighth aspect, this application provides a chip, including a memory and a processor. The memory is configured to store a computer program, and the processor is configured to invoke the computer program from the memory and run the computer program, to perform the method according to any one of the first aspect and the possible implementations of the first aspect.

In an embodiment, the chip includes a processor. The processor is configured to read and execute a computer program stored in a memory. When the computer program is executed, the processor performs the method according to any one of the first aspect or the possible implementations of the first aspect.

DESCRIPTION OF EMBODIMENTS

The following describes embodiments of this application with reference to the accompanying drawings in the embodiments of this application.

Wireless communications technologies are widely applied because of their features such as a short deployment period, strong natural disaster resistance, and low construction and O&M costs. However, wireless communications systems of a plurality of standards coexist, a network structure becomes increasingly complex, a network scale and a quantity of users grow rapidly, and a wireless environment is complex and variable. As a result, a network interference problem becomes increasingly serious. Some extranet third-party interference sources exist in an actual network, and may cause co-channel interference to an intranet AP. Interference not only causes a decrease in a signal-to-noise ratio and a throughput and degradation of base station performance, but also results in a higher offline rate, thereby affecting user experience. Therefore, network interference analysis affects quality of a wireless network service, and has become an important network O&M optimization job.

In a related technology, an indicator is set for an interference source based on a device type, a working period, and a power of the interference source. For example, 1 to 100 are used as different indicator values, and the value of the indicator reflects a value of an interference degree of the interference source. However, in this manner, only the device type, the working period, and the power are considered, but the device type, the working period, and the power cannot accurately reflect a hazard degree of the interference source. Therefore, in the related technology, a harmful interference source cannot be accurately identified or avoided, thereby affecting network performance.

Figure 1:
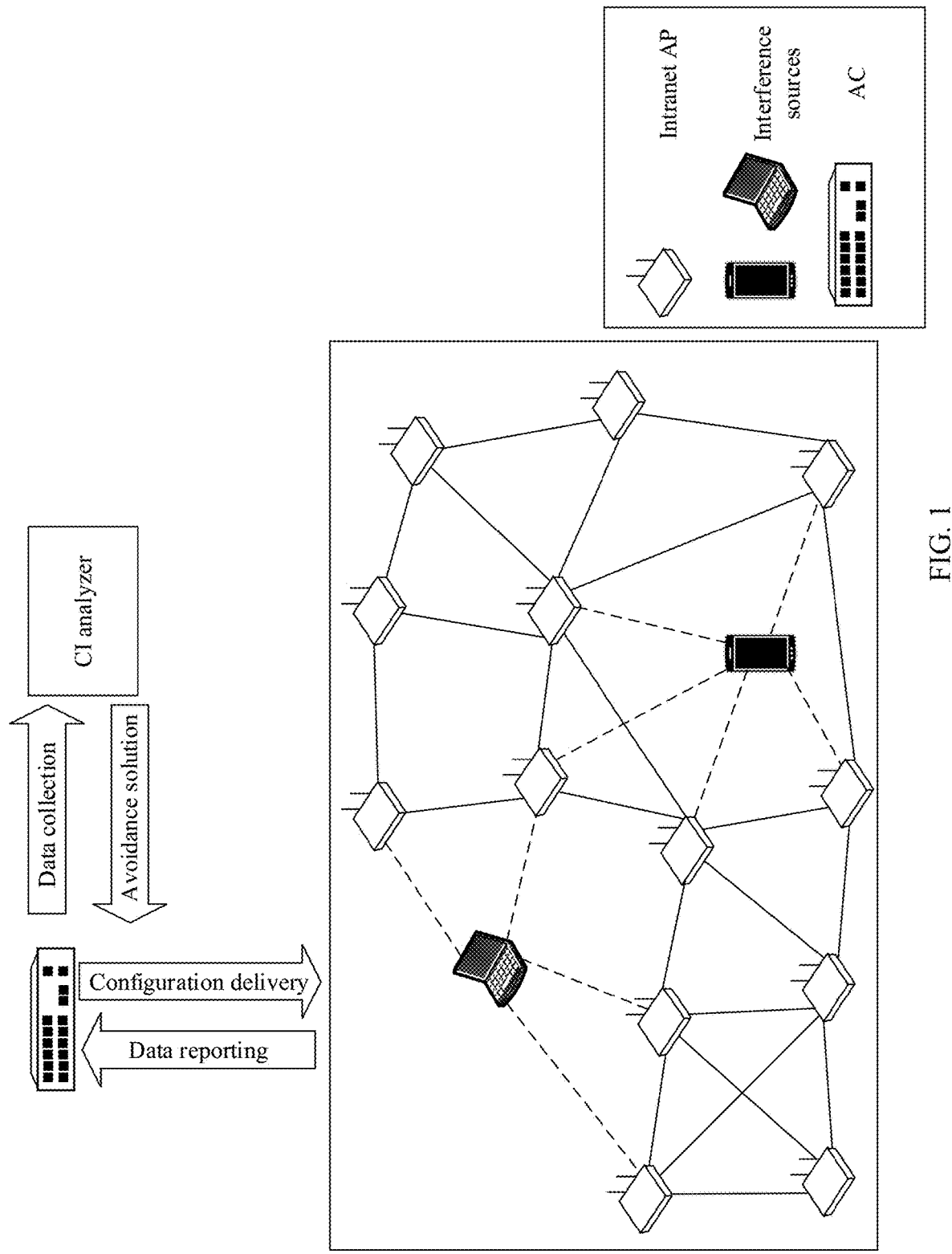
FIG. 1 is a schematic diagram of a system architecture of an implementation environment according to an embodiment of this application.

In view of this, an embodiment of this application provides an interference source detection method. In the method, load information is further considered on a basis of considering signal strength, an impact priority of an interference source is determined based on this, and a more harmful high-load interference source is preferentially avoided, to reduce a hazard caused by the interference source. Detection and avoidance of a third-party interference source are addressed, and a harmful interference source is accurately identified and avoided, thereby improving network performance. The method may be applied to a system architecture of an implementation environment shown in FIG. 1. As shown in FIG. 1, the system includes an access controller (AC), an AP, and an intelligent O&M (e.g., campus insight (CI)) analyzer. The CI analyzer is an interference source detection device.

During interference source detection, the intranet AP scans detected data such as neighbor relationship information (including an RSSI) and load information, and reports the data to the AC. Then the AC reports collected data to the CI analyzer. The CI analyzer analyzes a current interference status by using a series of algorithm operations, outputs information about an interference source, and feeds back the information about the interference source to the AC together with an avoidance solution. The AC delivers a received configuration, to provide an effective solution for a user to quickly respond to an interference source problem.

In another example embodiment, after detecting data such as neighbor relationship information (including an RSSI) and load information, the AP may alternatively directly report the data to the CI analyzer, without reporting the data to the AC and then reporting the data to the CI analyzer by using the AC. The CI analyzer analyzes a current interference status by using a series of algorithm operations, outputs information about an interference source, and feeds back the information about the interference source to the AC together with an avoidance solution. The AC delivers a received configuration, to provide an effective solution for a user to quickly respond to an interference source problem.

Figure 2:
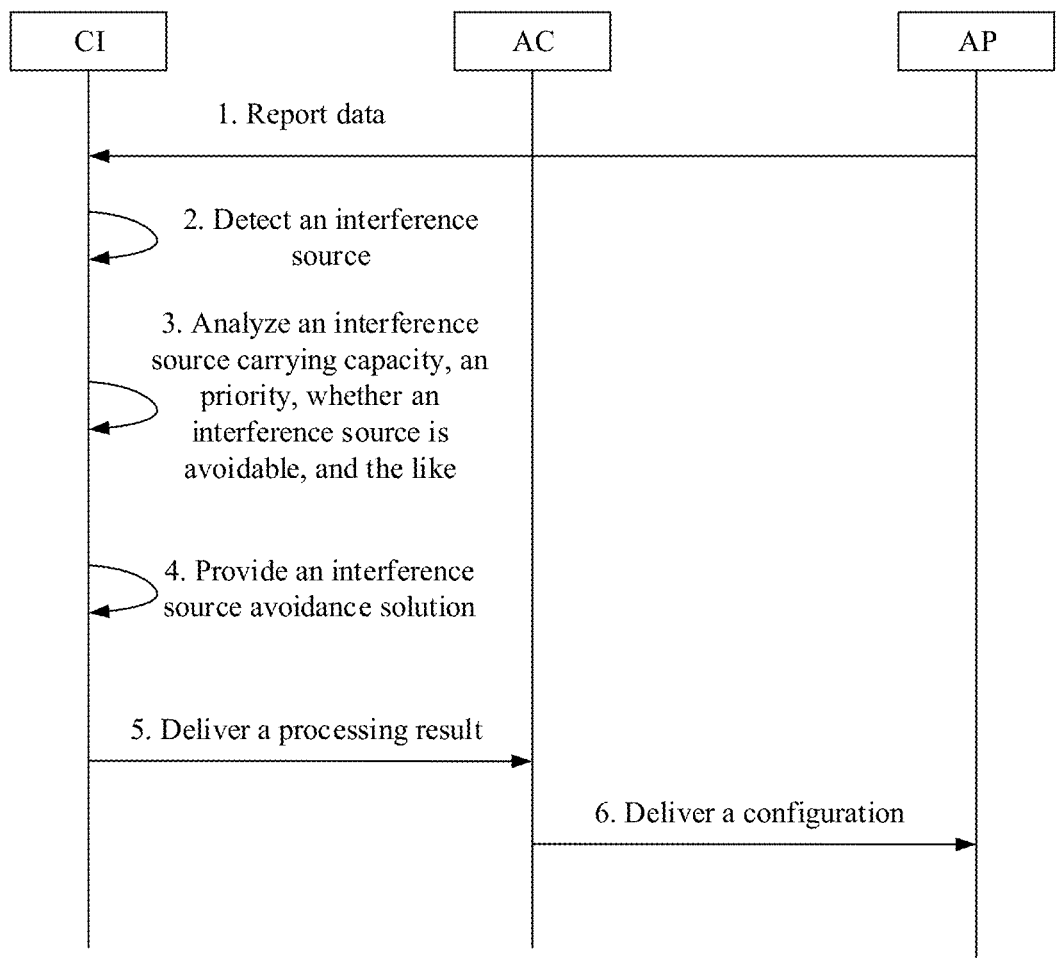
FIG. 2 is a schematic diagram of interaction in an interference source detection method according to an embodiment of this application.

With reference to the system architecture shown in FIG. 1, an interaction process of the method may be shown in FIG. 2, and includes but is not limited to the following operations.

Operation 1: The AP reports detected data to the AC. For any AP, data detected by the any AP includes load information and radio frequency information of the any AP, RSSI information between the any AP and a neighbor of the any AP, and load information and radio frequency information of the neighbor of the any AP. Then the AC summarizes the data and reports the data to the CI analyzer.

Operation 2: The CI analyzer performs interference source detection to obtain a global neighbor topology, and determines an interference source based on the global neighbor topology.

Operation 3: The CI analyzer analyzes the global neighbor topology to obtain information such as a carrying capacity in a current network status, a priority of a current interference source (which is determined, for example, based on an interference degree of the interference source, where for details about a manner of determining the interference degree, reference may be made to descriptions in an embodiment shown in FIG. 5), and whether the interference source is avoidable.

Operation 4: The CI analyzer provides an avoidance solution for the interference source, to provide an effective solution for a user to quickly respond to an interference source problem.

Operation 5: The CI analyzer feeds back a processing result to the AC, where the processing result includes the information about the interference source, and may also include the avoidance solution for the interference source.

Operation 6: The AC delivers a configuration to the AP.

Figure 3:
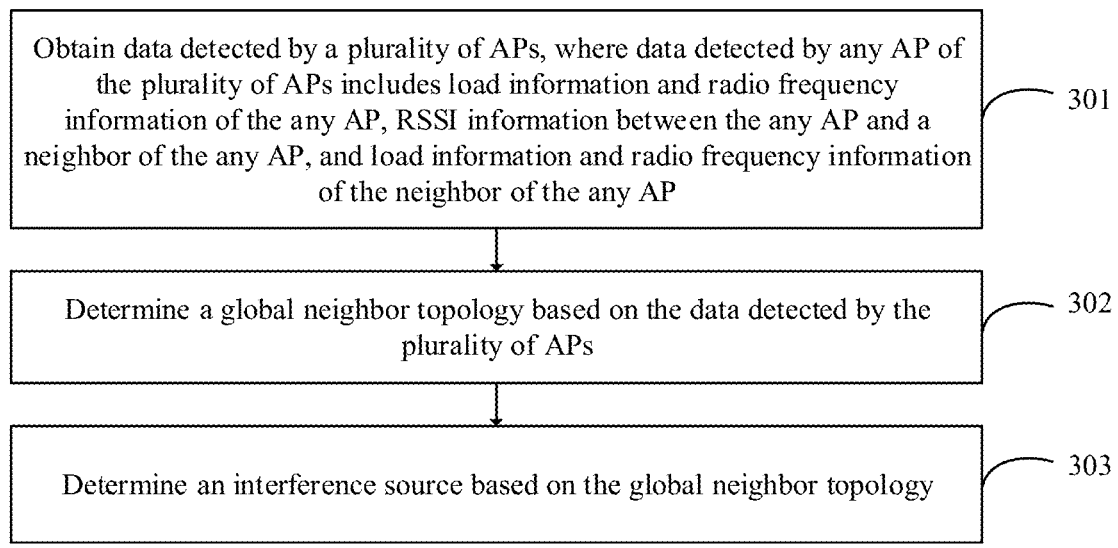
FIG. 3 is a flowchart of an interference source detection method according to an embodiment of this application.

The following describes an interference source detection process. As shown in FIG. 3, an embodiment of this application provides an interference source detection method. The method may be performed by an interference source detection device. For example, the method is performed by the CI analyzer, and includes but is not limited to the following process.

Operation 301: Obtain data detected by a plurality of APs, where data detected by any AP of the plurality of APs includes load information and radio frequency information of the any AP, RSSI information between the any AP and a neighbor of the any AP, and load information and radio frequency information of the neighbor of the any AP.

For example, each AP in a network may transmit a neighbor detection packet, and obtain detected data by using the detection packet. For any AP of the plurality of APs, data detected by the any AP includes but is not limited to load information and radio frequency information (for example, channel information) of the any AP, and may further include RSSI information between the any AP and a neighbor of the any AP, and load information and radio frequency information of the neighbor of the any AP. Then each AP may report detected data to the AC, and the AC summarizes the data and reports the data to the CI analyzer, so that the CI analyzer obtains the data detected by the plurality of APs.

Alternatively, each AP may directly report detected data to the CI analyzer without using the AC. For example, the CI analyzer may provide a data access interface, and receive, through the data access interface, the data detected by the plurality of APs.

It should be noted that, after the data detected by the plurality of APs is obtained, if an RSSI is relatively small, it indicates that a neighbor relationship is weak, and reference value is relatively small. Therefore, the neighbor relationship may be removed, that is, RSSI information without reference value is removed. For example, RSSI information less than a threshold is removed. To be specific, the method provided in this embodiment of this application further includes a data preprocessing process. The preprocessing means removing some neighbor relationships based on RSSI information in data detected by an AP, to reduce a calculation amount of calculation subsequently performed on the information without reference value.

Operation 302: Determine a global neighbor topology based on the data detected by the plurality of APs.

The data detected by the plurality of APs includes RSSI information between any AP and a neighbor of the any AP. The RSSI information may be used to reflect a neighbor relationship. Therefore, a neighbor relationship between APs may be determined based on the data detected by the plurality of APs. In addition, the network may further include an interference source in addition to the APs. Therefore, a neighbor of an AP may also include an interference source in addition to another AP. To be specific, based on data detected by an AP, whether the AP has a neighbor relationship with an interference source may be further determined in addition to determining a neighbor relationship between the AP and another AP.

A neighbor relationship of each AP is determined based on data detected by all APs in the network, so that the global neighbor topology can be obtained. The global neighbor topology describes neighbor relationships between APs and between an AP and an interference source in the network.

Operation 303: Determine an interference source based on the global neighbor topology.

In an example embodiment, the determining an interference source based on the global neighbor topology includes:

distinguishing between an intranet AP and the interference source in the global neighbor topology based on an intranet AP table, to obtain information about the interference source.

The intranet AP table is used to record information about an intranet AP, and an intranet AP in the network may be determined by using the intranet AP table. Therefore, after the global neighbor topology is determined based on the data detected by the APs, the intranet AP and the interference source in the global neighbor topology may be distinguished by using the intranet AP table. For example, in the global neighbor topology, a device recorded in the intranet AP table is an intranet AP, and a device not recorded in the intranet AP table is an interference source. For example, because the AC manages a resource of an intranet AP, the AC may obtain the intranet AP table, and report the intranet AP table to the CI analyzer. In addition, the intranet AP table may alternatively be directly configured on the CI analyzer, or another manner may be used, so that the CI analyzer can obtain the intranet AP table in advance. A manner of determining an interference source based on the intranet AP table obtained in advance improves interference source detection efficiency.

In the method provided in this embodiment of this application, data detected by an AP is obtained, and the detected data not only includes RSSI information used to reflect a neighbor relationship, but also includes load information of the AP and a neighbor of the AP. Therefore, after the global neighbor topology is determined based on the data detected by the AP, the interference source determined based on the global neighbor topology is more accurate. This provides a basis for subsequently avoiding the interference source, and can further improve network performance.

Figure 4:
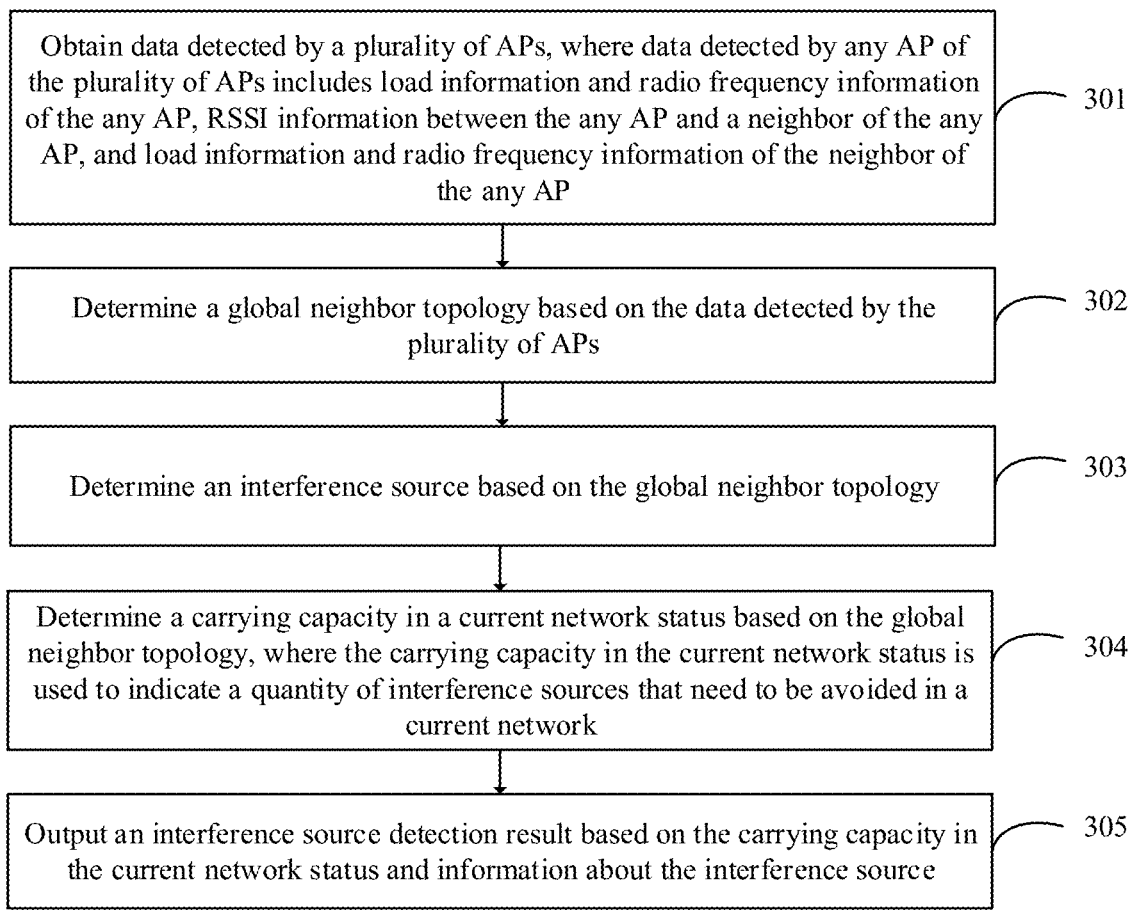
FIG. 4 is a flowchart of an interference source detection method according to an embodiment of this application.

In addition to detecting an interference source, the method provided in this embodiment of this application may further provide an avoidance solution for the interference source on a basis of detecting the interference source. As shown in FIG. 4, after the interference source is determined based on operations 301 to 303, the method provided in this embodiment of this application further includes the following processes.

Operation 304: Determine a carrying capacity in a current network status based on the global neighbor topology, where the carrying capacity in the current network status is used to indicate a quantity of interference sources that a current network is capable of carrying.

The global neighbor topology describes neighbor relationships between APs and between an AP and an interference source in the network. Therefore, in the method provided in this embodiment of this application, the global neighbor topology is used to determine the quantity of interference sources that the current network is capable of carrying, that is, determine the carrying capacity in the current network status. In an embodiment, the determining a carrying capacity in a current network status based on the global neighbor topology includes: distinguishing between the intranet AP and the interference source in the global neighbor topology based on the intranet AP table, to obtain an intranet AP topology; and determining the carrying capacity in the current network status based on the intranet AP topology. For example, for a manner of obtaining the intranet AP table, refer to the descriptions in operation 303. Details are not described herein again. Because the intranet AP and the interference source in the global neighbor topology can be distinguished by using the intranet AP table, the intranet AP topology can be obtained based on the intranet AP table. The intranet AP topology describes a topological relationship between intranet APs.

Because a congestion degree of the current network can be measured by a maximum complete subgraph, the determining the carrying capacity in the current network status based on the intranet AP topology includes: searching for a maximum complete subgraph in the intranet AP topology; and calculating a minimum carrying capacity corresponding to the maximum complete subgraph, and using the minimum carrying capacity corresponding to the maximum complete subgraph as the carrying capacity in the current network status.

For example, the intranet AP topology may be expressed as a graph G=(V, E), where V={1, . . . , y} and is a vertex set of the graph G, V may be an intranet AP set in this embodiment of this application, and E is an edge set of the graph G and may be identified by an RSSI between APs. A clique of the graph G is a set of vertexes, where there is an edge between two vertexes. Simply, the clique is a complete subgraph of G. If a clique is not included in any other clique, that is, the clique is not a true subset of any other cluster, the clique is referred to as a maximal clique (maximal clique) of the graph G. A maximal clique with most vertexes is referred to as a maximum clique (maximum clique) of the graph G. The maximum clique of G is a maximum complete subgraph of G.

In an embodiment, the calculating a minimum carrying capacity corresponding to the maximum complete subgraph includes: determining, by using the following formula, the minimum carrying capacity $M_{min}$ corresponding to the maximum complete subgraph:

$$M_{min}=M-K_1, \text{where}$$

M is a quantity of available channels in the current network, and $K_1$ is a degree of the maximum complete subgraph.

A value of M varies based on different types of the current network. A value of M is not limited in this embodiment of this application. Using the fifth-generation mobile communications technology (5G) network as an example, the value of M may be 13. In this case, if the degree of the maximum complete subgraph is $K_1$, the determined minimum carrying capacity $M_{min}$ corresponding to the maximum complete subgraph is equal to $13-K_1$.

In addition to the foregoing manner of determining the carrying capacity, a theoretical maximum carrying capacity may be alternatively used as the carrying capacity in the current network status. In an embodiment, the determining the carrying capacity in the current network status based on the intranet AP topology includes: searching for a maximum complete subgraph in the intranet AP topology; removing a found maximum complete subgraph from the intranet AP topology, and then continuing to search for a maximum complete subgraph in the current topology, and so on, until a dimension of a found maximum complete subgraph is a reference dimension; and determining a theoretical maximum carrying capacity based on a quantity of found maximum complete subgraphs and a minimum carrying capacity corresponding to each maximum complete subgraph, and using the theoretical maximum carrying capacity as the carrying capacity in the current network status.

A manner of searching for a maximum complete subgraph in the intranet AP topology may be implemented based on the foregoing manner of searching for a maximum complete subgraph. Each time a maximum complete subgraph is found, the maximum complete subgraph is removed from the topology to obtain a new topology, that is, the current topology changes based on the found maximum complete subgraph. However, each time a maximum complete subgraph is found in the current topology, a minimum carrying capacity corresponding to the maximum complete subgraph may be calculated in the foregoing manner. The process is repeated, until a dimension of a found maximum complete subgraph is the reference dimension. The dimension of the maximum complete subgraph is used to indicate a quantity of vertexes in the maximum complete subgraph. The reference dimension may be set based on experience or a scenario. For example, the reference dimension may be 2. When a dimension of a found maximum complete subgraph is 2, the search stops. Then the theoretical maximum carrying capacity is determined based on the quantity of found maximum complete subgraphs and the minimum carrying capacity corresponding to each maximum complete subgraph, and the theoretical maximum carrying capacity is used as the carrying capacity in the current network status.

In an embodiment, the determining a theoretical maximum carrying capacity based on a quantity of found maximum complete subgraphs and a minimum carrying capacity corresponding to each maximum complete subgraph includes: determining, by using the following formula, the theoretical maximum carrying capacity $M_{max}$ based on the quantity of found maximum complete subgraphs and the minimum carrying capacity corresponding to each maximum complete subgraph:

$$M_{max}=\Sigma_{i=1}^{n}[M-K_i], \text{ where}$$

M is a quantity of available channels in the current network, n is the quantity of found maximum complete subgraphs, and $K_i$ is a degree of the $i^{th}$ maximum complete subgraph.

Operation 305: Output an interference source detection result based on the carrying capacity in the current network status and the information about the interference source.

In an embodiment, the outputting an interference source detection result based on the carrying capacity in the current network status and the information about the interference source includes but is not limited to the following two manners.

Manner 1: The outputting an interference source detection result based on the carrying capacity in the current network status and the information about the interference source includes: for any interference source, determining, based on information about the any interference source, whether the any interference source is avoidable; and outputting the information about the interference source, information about an avoidable interference source, and the carrying capacity in the current network status as the interference source detection result.

For details about a manner of determining whether any interference source is avoidable in the manner 1, refer to descriptions in a manner 2. Details are not described herein. The information about the interference source, the information about the avoidable interference source, and the carrying capacity in the current network status are output as the interference source detection result, and may be displayed to a user, and the user determines, based on the interference source detection result, interference sources to be removed, thereby providing effective measures and providing assurance for quickly responding to an interference source problem.

In addition, the method provided in this embodiment of this application further provides a manner of calculating an interference degree of an interference source. The interference degree of the interference source may indicate a hazard degree of the interference source. For example, a greater interference degree indicates a greater hazard degree. Therefore, interference sources may be sorted based on interference degrees, to reflect a sequence of hazard degrees of the interference sources through sorting. The interference sources may be sorted based on the interference degrees to play a reminder function, so that efficiency for subsequently responding to an interference source problem can be improved. In an embodiment, the outputting the information about the interference source, information about an avoidable interference source, and the carrying capacity in the current network status as the interference source detection result includes: sorting interference sources based on interference degrees of the interference sources; and outputting the information about the interference source, the information about the avoidable interference source, and the carrying capacity in the current network status based on a sorting result.

It should be noted that, in addition to outputting the information about the interference source, the information about the avoidable interference source, and the carrying capacity in the current network status as the interference source detection result, in an embodiment, the information about the interference source, information about an unavoidable interference source, and the carrying capacity in the current network status may be output as the interference source detection result. Once the information about the unavoidable interference source is known, the information about the avoidable interference source is also known if information about all interference sources is known.

Manner 2: The outputting an interference source detection result based on the carrying capacity in the current network status and the information about the interference source includes: for any interference source, determining, based on information about the any interference source, whether the any interference source is avoidable; and sorting interference sources based on interference degrees of the interference sources, determining a target avoidable interference source in the sorted interference sources based on the carrying capacity in the current network status, and outputting information about the target avoidable interference source as the interference source detection result.

In an embodiment, in addition to outputting the information about the target avoidable interference source as the interference source detection result in the manner 2, information about a target unavoidable interference source may be alternatively output as the interference source detection result. If the information about the target avoidable interference source is known, the information about the target unavoidable interference source may also be known.

Because an interference degree of an interference source may indicate a hazard degree of the interference source, the interference sources are sorted based on the interference degrees, to reflect a sequence of hazard degrees of the interference sources through sorting. Then an interference source that serves as the target interference source is determined based on the hazard degrees. The target interference source is an avoidable interference source in the interference sources, and is an interference source that meets the carrying capacity and that is selected from the sorted interference sources after the interference sources are sorted based on the interference degrees. For example, the carrying capacity in the current network status is 5, that is, the current network is capable of carrying five interference sources. If a quantity of interference sources determined in the network is 10 and six of the 10 interference sources are avoidable, an interference source with a least hazard degree is selected from the six avoidable interference sources based on interference degrees, remaining five avoidable interference sources serve as avoidable target interference sources, and information about the avoidable target interference sources is output.

In an embodiment, before the sorting interference sources based on interference degrees of the interference sources, the method further includes: for any interference source $X_i$, calculating an interference degree $D_i$ of the any interference source based on a load of the any interference source and an impact domain of the any interference source by using the following formula:

$$D_i = \Sigma_j \min\{\text{Load}(X_i), \text{Load}(B_{i,j})\}, \text{ where}$$

$\text{Load}(X_i)$ is the load of the any interference source $X_i$, and $\text{Load}(B_{i,j})$ is a load of $B_{i,j}$ in the impact domain of the any interference source $X_i$.

In an embodiment, before the sorting interference sources based on interference degrees of the interference sources, the method further includes: for any interference source, determining, among intranet APs, a neighboring intranet AP of the any interference source, to obtain a neighboring AP set; and determining, among the intranet APs, a neighbor of each AP in the neighboring AP set, and combining the neighbor of each AP in the neighboring AP set into the neighboring AP set, to obtain the impact domain of the any interference source.

For example, for any interference source, a neighboring AP set obtained by determining, among the intranet APs, a neighboring intranet AP of the any interference source $X_i$ is as follows: $A_i = \{A_{i,j}\}$, where $A_{i,j}$ is the $j^{th}$ neighbor of the any interference source $X_i$. A value of j may be determined based on an actual network. The value of j is not limited in this embodiment of this application. Then neighbors of all APs in the set $A_i$ are determined, and a determined neighbor of each AP in the neighboring AP set and the set $A_i$ constitute a new set, to obtain an impact domain: $B_i = \{B_{i,j}\}$, where $B_{i,j}$ is an object in the new set.

For example, because the impact domain of the any interference source $X_i$ includes the neighboring AP set of the any interference source $X_i$ and the neighbor of each AP in the neighboring AP set, for each $B_{i,j}$ in the impact domain of the any interference source $X_i$, a corresponding $\text{Load}(B_{i,j})$ may be obtained, each Load $(B_{i,j})$ is compared with a load Load $(X_i)$ of the any interference source $X_i$, and a minimum value of the two values is output. Then minimum values obtained by comparing each $\text{Load}(B_{i,j})$ with the load $\text{Load}(X_i)$ of the any interference source $X_i$ are added, to obtain an interference degree of the any interference source $X_i$.

A current channel allocation algorithm is based on an idea of exhaustion. Therefore, when it is determined whether any interference source is avoidable, in the method provided in this embodiment of this application, it only needs to be determined whether there is an idle channel in a local region of the interference source. A channel allocation solution is performed based in a local topology subgraph of the interference source, to determine whether co-channel interference exists, so as to determine whether the interference source is avoidable. Then information about all interference sources and information about an avoidable interference source may be output based on sorting of interference degrees.

In an embodiment, the determining, based on information about the any interference source, whether the any interference source is avoidable includes: determining an allocatable channel set of a network neighbor of the any interference source based on the information about the any interference source; sequentially allocating channels in a local topology based on the channel set, where the local topology includes the any interference source and the network neighbor of the any interference source; and determining, based on each channel allocation result, whether the any interference source is avoidable.

For example, each intranet neighbor of any interference source is expressed as $A_{i,j}$. An allocatable channel set $CH_{i,j}$ of $A_{i,j}$ is calculated based on a channel allocation status of $A_{i,j}$, and the any interference source and the intranet neighbor $A_{i,j}$ of the any interference source constitute a local topology. Then simulated channel allocation may be performed on the local topology in an exhaustive manner based on the allocable channel set $CH_{i,j}$. Whether the any interference source is avoidable is determined based on each channel allocation result. For example, the determining whether the any interference source is avoidable based on each channel allocation result may be determining, based on each channel allocation result, whether the any interference source causes co-channel interference, for example, whether a same channel is allocated to the any interference source and an AP. If a same channel is allocated, co-channel interference is caused. If at least one determining result is that the any interference source does not cause co-channel interference, it may be determined that the any interference source is avoidable.

In an embodiment, after the determining a carrying capacity in a current network status based on the global neighbor topology, the method further includes: when a quantity of all interference sources is less than the carrying capacity in the current network status, allocating a radio frequency resource to an intranet AP in the global topology based on the information about the interference source. That the quantity of all interference sources is less than the carrying capacity in the current network status means that the quantity of all interference sources falls within a range of the quantity of interference sources that the current network is capable of carrying. Therefore, the interference source may not be removed. However, to reduce interference from the interference source, the interference source may be avoided when a radio frequency resource is allocated.

Figure 6:
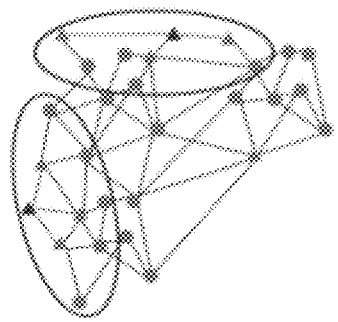
FIG. 6 is a schematic diagram of a structure of a network topology according to an embodiment of this application.

For example, as shown in FIG. 6, interference sources are added to a topology. In FIG. 6, triangular points indicate interference sources, and circular points indicate intranet APs. The interference sources are grouped into a topology group 0, and a channel and load of the interference sources may be determined based on data detected by the APs, to assist a DBS algorithm in channel bandwidth allocation. In this way, radio frequency resources such as channels and bandwidth are allocated to intranet AP groups (for example, intranet APs enclosed in a circle in FIG. 6 constitute a group) in a global topology. In this way, a more harmful interference source is preferentially avoided in limited radio frequency resources such as channels and bandwidth, thereby improving overall network quality.

When the quantity of all interference sources is greater than the carrying capacity in the current network status, a manner of manually removing the interference source may be recommended, to avoid a problem caused by the interference source. For example, according to the manner of outputting the interference source detection result in the manner 1, a user removes the interference source based on the interference source detection result, to improve network performance.

In a related technology, a solution for allocating radio frequency resources such as channels and bandwidth is implemented by an algorithm based on an idea of exhaustion. A key factor lies in that all APs are sorted based on priorities during exhaustion, and bandwidth and channel resources are preferentially allocated to an AP ranked top. In the current channel allocation solution, only interference energy of each object is considered when sorting is performed. In the method provided in this embodiment of this application, APs may be re-sorted with reference to both loads and neighbor information of the APs. Radio frequency resource allocation is performed based on a sorting result, so that interference can be further reduced. Therefore, in an embodiment, the allocating a radio frequency resource to an intranet AP in the global topology based on the information about the interference source includes: calculating a quantity of neighbors of each intranet AP; performing weighted averaging based on a load of each intranet AP and the quantity of neighbors of each intranet AP, to obtain a priority of the intranet AP; and performing radio frequency resource allocation based on the information about the interference source and the priority of the intranet AP. When weighted averaging is performed based on the load of each intranet AP and the quantity of neighbors of each intranet AP to obtain the priority of the intranet AP, a higher load and a larger quantity of neighbors of the intranet AP indicate a higher priority of the AP. Corresponding values may be respectively set with respect to the load of each intranet AP and the quantity of neighbors of each intranet AP. Then a value corresponding to the load and a value corresponding to the quantity of neighbors are summed up. A larger sum value indicates a higher priority of the AP.

Figure 5:
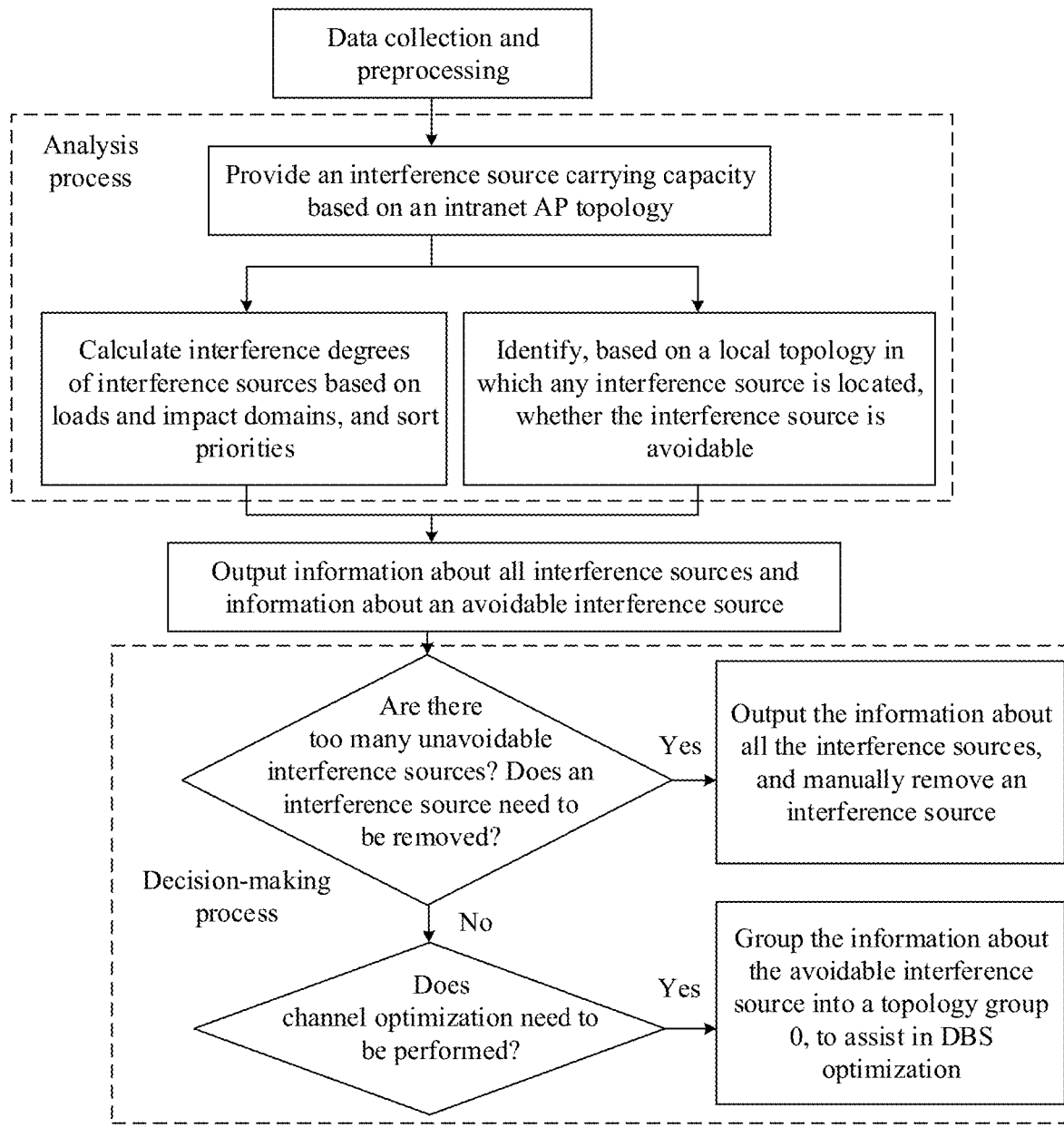
FIG. 5 is a schematic diagram of interference source analysis and avoidance decision-making processes according to an embodiment of this application.

With reference to the method procedure shown in FIG. 4, for example, as shown in FIG. 5, a process of detecting an interference source and avoiding an interference source includes both an interference analysis process and an avoidance decision-making process. As shown in FIG. 5, data detected by an AP is obtained through data collection. The data detected by the AP may be preprocessed. For example, a neighbor relationship whose RSSI is less than a threshold is removed. The threshold may be set based on experience or a scenario. That the RSSI is less than the threshold indicates that the neighbor relationship is weak. Therefore, the neighbor relationship is removed in the method provided in this embodiment of this application. After an interference source is determined based on the data detected by the AP, an interference source carrying capacity, namely, a quantity of interference sources that a current network can carry, may be obtained based on an intranet AP topology. Then interference degrees of interference sources may be calculated based on loads and impact domains of the interference sources, and sorting is performed based on the interference degrees, to determine priorities. In addition, whether any interference source is avoidable may be further identified based in a local topology in which the interference source is located. Information about all interference sources and information about an avoidable interference source may be output. On this basis, whether a quantity of unavoidable interference sources is excessively large is determined, that is, whether a quantity of all interference sources exceeds the carrying capacity is determined. If the quantity of all interference sources exceeds the carrying capacity, an interference source needs to be removed. The information about all the interference sources may be output, and an interference source is manually removed. If the quantity of all interference sources does not exceed the carrying capacity, whether to perform channel optimization may be determined. To be specific, interference from an interference source is avoided by allocating radio frequency resources such as channels. If channel optimization needs to be performed, the information about the avoidable interference source may be grouped into a topology group 0, to assist in DBS optimization.

To sum up, in this embodiment of this application, an interference degree of an interference source may be calculated based on signal strength of the interference source and a load status of the interference source, and with reference to information about the interference source, to screen out a more harmful interference source. In this way, interference sources are effectively avoided, thereby improving user experience and product competitiveness.

Figure 7:
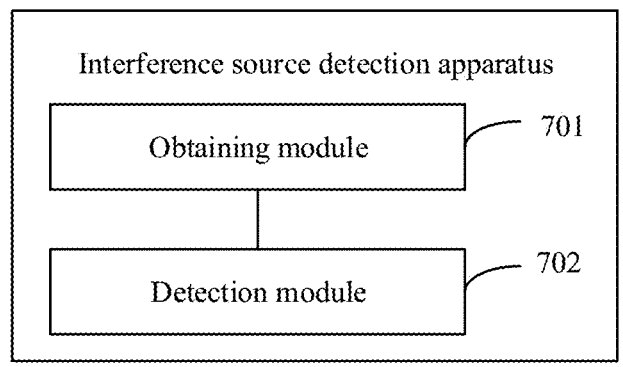
FIG. 7 is a schematic diagram of a structure of an interference source detection apparatus according to an embodiment of this application.

Refer to FIG. 7. An embodiment of this application provides an interference source detection apparatus. The apparatus includes:

an obtaining module 701, configured to obtain data detected by a plurality of access points APs, where data detected by any AP of the plurality of APs includes load information and radio frequency information of the any AP, received signal strength indicator RSSI information between the any AP and a neighbor of the any AP, and load information and radio frequency information of the neighbor of the any AP; and a detection module 702, configured to determine a global neighbor topology based on the data detected by the plurality of APs, and determine an interference source based on the global neighbor topology.

In an embodiment, the detection module 702 is configured to distinguish between an intranet AP and the interference source in the global neighbor topology based on an intranet AP table, to obtain information about the interference source.

In an embodiment, the detection module 702 is further configured to: determine a carrying capacity in a current network status based on the global neighbor topology, where the carrying capacity in the current network status is used to indicate a quantity of interference sources that a current network is capable of carrying; and output an interference source detection result based on the carrying capacity in the current network status and the information about the interference source.

In an embodiment, the detection module 702 is configured to: distinguish between the intranet AP and the interference source in the global neighbor topology based on the intranet AP table, to obtain an intranet AP topology; and determine the carrying capacity in the current network status based on the intranet AP topology.

In an embodiment, the detection module 702 is configured to: search for a maximum complete subgraph in the intranet AP topology; and calculate a minimum carrying capacity corresponding to the maximum complete subgraph, and use the minimum carrying capacity corresponding to the maximum complete subgraph as the carrying capacity in the current network status.

In an embodiment, the detection module 702 is configured to determine, by using the following formula, the minimum carrying capacity $M_{min}$ corresponding to the maximum complete subgraph:

$$M_{min} = M - K_1, \text{ where}$$

M is a quantity of available channels in the current network, and $K_1$ is a degree of the maximum complete subgraph.

In an embodiment, the detection module 702 is configured to: search for a maximum complete subgraph in the intranet AP topology; remove a found maximum complete subgraph from the intranet AP topology, and then continue to search for a maximum complete subgraph in the current topology, and so on, until a dimension of a found maximum complete subgraph is a reference dimension; and determine a theoretical maximum carrying capacity based on a quantity of found maximum complete subgraphs and a minimum carrying capacity corresponding to each maximum complete subgraph, and use the theoretical maximum carrying capacity as the carrying capacity in the current network status.

In an embodiment, the detection module 702 is configured to determine, by using the following formula, the theoretical maximum carrying capacity $M_{max}$ based on the quantity of found maximum complete subgraphs and the minimum carrying capacity corresponding to each maximum complete subgraph:

$$M_{max} = \Sigma_{i=1}^{n} [M - K_i], \text{ where}$$

M is a quantity of available channels in the current network, n is the quantity of found maximum complete subgraphs, and $K_i$ is a degree of the $i^{th}$ maximum complete subgraph.

In an embodiment, the detection module 702 is configured to: for any interference source, determine, based on information about the any interference source, whether the any interference source is avoidable; and output the information about the interference source, information about an avoidable interference source, and the carrying capacity in the current network status as the interference source detection result.

In an embodiment, the detection module 702 is configured to: sort interference sources based on interference degrees of the interference sources; and output the information about the interference source, the information about the avoidable interference source, and the carrying capacity in the current network status based on a sorting result.

In an embodiment, the detection module 702 is configured to: for any interference source, determine, based on information about the any interference source, whether the any interference source is avoidable; and sort interference sources based on interference degrees of the interference sources, determine a target avoidable interference source in the sorted interference sources based on the carrying capacity in the current network status, and output information about the target avoidable interference source as the interference source detection result.

In an embodiment, the detection module 702 is further configured to: for any interference source $X_i$, calculate an interference degree $D_i$ of the any interference source based on a load of the any interference source and an impact domain of the any interference source by using the following formula:

$$D_i = \Sigma_j \min\{\text{Load}(X_i), \text{Load}(B_{i,j})\}, \text{ where}$$

$\text{Load}(X_i)$ is the load of the any interference source $X_i$, and $\text{Load}(B_{i,j})$ is a load of $B_{i,j}$ in the impact domain of the any interference source $X_i$.

In an embodiment, the detection module 702 is further configured to: for any interference source, determine, among intranet APs, a neighboring intranet AP of the any interference source, to obtain a neighboring AP set; and determine, among the intranet APs, a neighbor of each AP in the neighboring AP set, and combine the neighbor of each AP in the neighboring AP set into the neighboring AP set, to obtain the impact domain of the any interference source.

In an embodiment, the detection module 702 is configured to: determine an allocatable channel set of a network neighbor of the any interference source based on the information about the any interference source; sequentially allocate channels in a local topology based on the channel set, where the local topology includes the any interference source and the network neighbor of the any interference source; and determine, based on each channel allocation result, whether the any interference source is avoidable.

Figure 8:
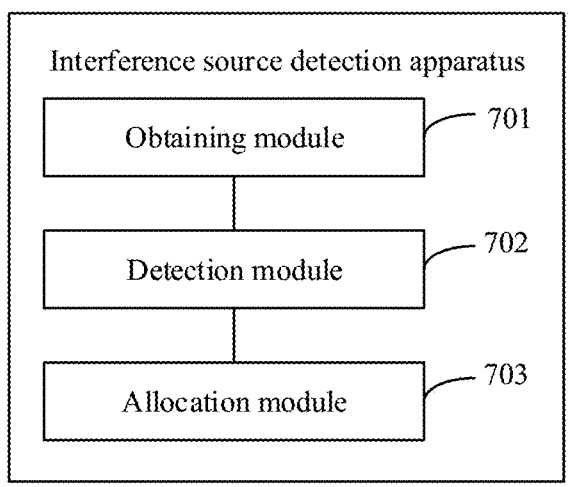
FIG. 8 is a schematic diagram of a structure of an interference source detection apparatus according to an embodiment of this application.

In an embodiment, as shown in FIG. 8, the apparatus further includes an allocation module 703, configured to: when a quantity of all interference sources is less than the carrying capacity in the current network status, allocate a radio frequency resource to an intranet AP in the global topology based on the information about the interference source.

In an embodiment, the allocation module 703 is configured to: calculate a quantity of neighbors of each intranet AP; perform weighted averaging based on a load of each intranet AP and the quantity of neighbors of each intranet AP, to obtain a priority of the intranet AP; and perform radio frequency resource allocation based on the information about the interference source and the priority of the intranet AP.

It should be understood that, when the apparatuses provided in FIG. 7 and FIG. 8 implement functions of the apparatuses, division of the foregoing function modules is merely used as an example for description. In an actual application, the foregoing functions may be allocated to different function modules and implemented according to a requirement, in other words, an inner structure of a device is divided into different function modules, to implement all or some of the functions described above. In addition, the apparatuses in the foregoing embodiments and the method embodiments are based on a same idea. For a specific implementation process, refer to the method embodiments. Details are not described herein again.

Figure 9:
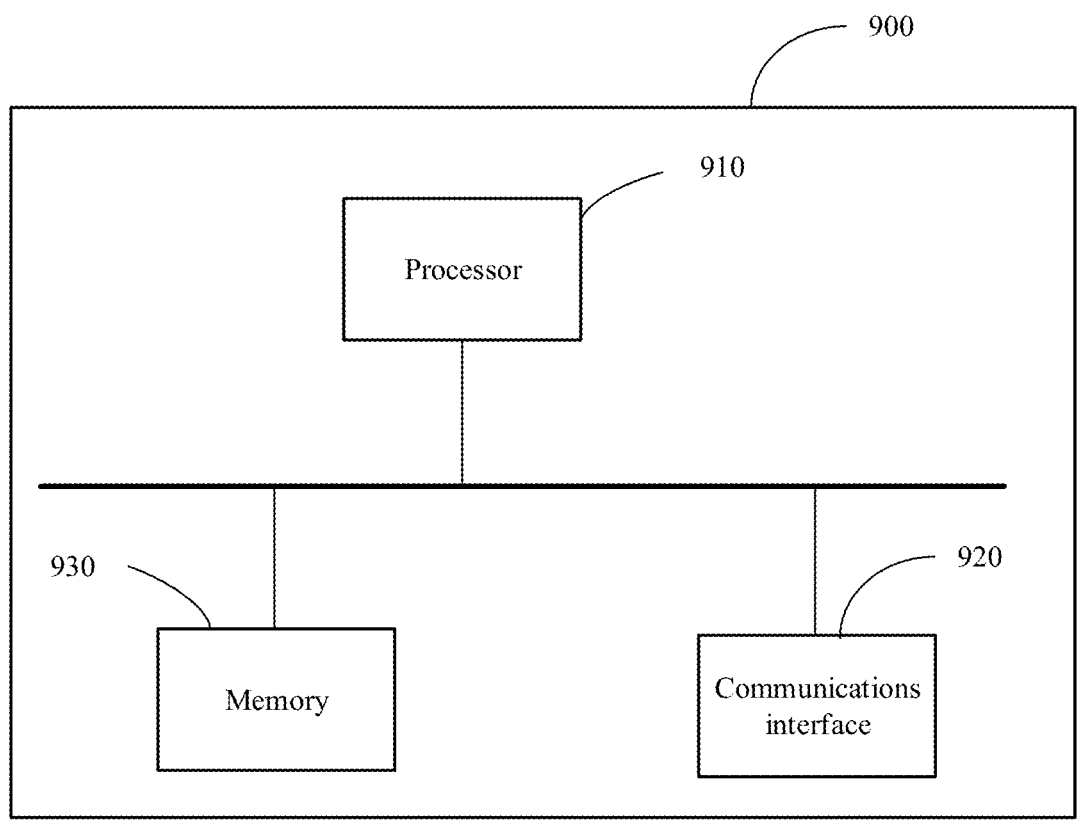
FIG. 9 is a schematic diagram of a structure of an interference source detection device according to an embodiment of this application.

This application further provides an analysis device 900. The analysis device 900 is configured to perform the foregoing method, and may be specifically the cloud analyzer shown in FIG. 1. As shown in FIG. 9, the analysis device 900 includes a processor 910 and a plurality of communications interfaces 920.

The processor 910 is configured to implement an operation performed by the cloud analyzer in the foregoing method embodiment of this application. When communicating with another device, the processor 910 communicates with the another device through the communications interface 920. The processor 910 may be specifically a central processing unit (CPU), an application-specific integrated circuit (ASIC), or one or more integrated circuits configured to implement this embodiment of this application.

As shown in FIG. 9, the analysis device 900 may further include a memory 930. The processor 910 and the memory 930 may communicate with each other through a bus. The memory 930 is configured to store computer operation instructions, and may be specifically a high-speed random access memory (RAM), or may be a non-volatile memory. The processor 910 may specifically execute the computer operation instructions stored in the memory 930. The computer operation instructions are executed, to enable the analysis device 900 to perform the operation performed by the cloud analyzer in the foregoing method.

A computer-readable storage medium is further provided. The storage medium stores at least one instruction. The instruction is loaded and executed by a processor, to implement the interference source detection method according to any one of the foregoing implementations.

This application provides a computer program. When the computer program is executed by a computer, a processor or the computer is enabled to perform corresponding operations and/or procedures in the foregoing method embodiments.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on the computer, some or all of the procedure or functions according to the embodiments of this application are generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a storage disk, or a magnetic tape), an optical medium (for example, a DVD), or a semiconductor medium (for example, a solid state disk (SSD)).

The "first" mentioned in the embodiments of this application is merely used as a name identifier, and does not represent the first in sequence. The rule is also applicable to "second", "third", and the like.

The foregoing descriptions are merely the embodiments of this application, but are not intended to limit this application. Any modification, equivalent replacement, or improvement made without departing from the spirit and principle of this application shall fall within the protection scope of this application.

What is claimed is:

1. An interference source detection method, comprising:
    obtaining data detected by a plurality of access points (APs), wherein data detected by any AP of the plurality of APs comprises load information and radio frequency information of the any AP, received signal strength indicator (RSSI) information between the any AP and a neighbor of the any AP, and load information and radio frequency information of the neighbor of the any AP;
    determining a global neighbor topology based on the data detected by the plurality of APs; and
    determining an interference source based on the global neighbor topology.

2. The method according to claim 1, wherein the determining an interference source based on the global neighbor topology comprises:
    distinguishing between an intranet AP and the interference source in the global neighbor topology based on an intranet AP table, to obtain information about the interference source.

3. The method according to claim 1, further comprising:
    after the determining an interference source based on the global neighbor topology, determining a carrying capacity in a current network status based on the global neighbor topology, wherein the carrying capacity in the current network status is used to indicate a quantity of interference sources that a current network is capable of carrying; and
    outputting an interference source detection result based on the carrying capacity in the current network status and the information about the interference source.

4. The method according to claim 3, wherein the determining a carrying capacity in a current network status based on the global neighbor topology comprises:
    distinguishing between the intranet AP and the interference source in the global neighbor topology based on an intranet AP table, to obtain an intranet AP topology; and
    determining the carrying capacity in the current network status based on the intranet AP topology.

5. The method according to claim 3, wherein the outputting an interference source detection result based on the carrying capacity in the current network status and the information about the interference source comprises:
    for any interference source, determining, based on information about the any interference source, whether the any interference source is avoidable; and
    outputting the information about the interference source, information about an avoidable interference source, and the carrying capacity in the current network status as the interference source detection result.

6. The method according to claim 5, wherein the outputting the information about the interference source, information about an avoidable interference source, and the carrying capacity in the current network status as the interference source detection result comprises:
    sorting interference sources based on interference degrees of the interference sources; and
    outputting the information about the interference source, the information about the avoidable interference source, and the carrying capacity in the current network status based on a sorting result.

7. The method according to claim 6, further comprising:
    before the sorting interference sources based on interference degrees of the interference sources, for any interference source $X_i$, calculating an interference degree $D_i$ of the any interference source based on a load of the any interference source and an impact domain of the any interference source by using the following formula:

$$D_i = \Sigma_j \min\{\text{Load}(X_i), \text{Load}(B_{i,j}))\}, \text{ wherein}$$

Load($X_i$) is the load of the any interference source $X_i$, and Load($B_{i,j}$) is a load of $B_{i,j}$ in the impact domain of the any interference source $X_i$.

8. The method according to claim 5, wherein the determining, based on information about the any interference source, whether the any interference source is avoidable comprises:
    determining an allocatable channel set of a network neighbor of the any interference source based on the information about the any interference source;
    sequentially allocating channels in a local topology based on the channel set, wherein the local topology comprises the any interference source and the network neighbor of the any interference source; and
    determining, based on each channel allocation result, whether the any interference source is avoidable.

9. The method according to claim 3, wherein the outputting an interference source detection result based on the carrying capacity in the current network status and the information about the interference source comprises:
    for any interference source, determining, based on information about the any interference source, whether the any interference source is avoidable; and sorting interference sources based on interference degrees of the interference sources, determining a target avoidable interference source in the sorted interference sources based on the carrying capacity in the current network status, and outputting information about the target avoidable interference source as the interference source detection result.

10. The method according to claim 3, further comprising:
after the determining a carrying capacity in a current network status based on the global neighbor topology, when a quantity of all interference sources is less than the carrying capacity in the current network status, allocating a radio frequency resource to the intranet AP in the global neighbor topology based on the information about the interference source.

11. The method according to claim 10, wherein the allocating a radio frequency resource to the intranet AP in the global neighbor topology based on the information about the interference source comprises:
calculating a quantity of neighbors of each intranet AP;
performing weighted averaging based on a load of each intranet AP and the quantity of neighbors of each intranet AP, to obtain a priority of the intranet AP; and
performing radio frequency resource allocation based on the information about the interference source and the priority of the intranet AP.

12. An interference source detection system, comprising:
a plurality of access points (APs); and
a detection device, and
wherein the plurality of APs are configured to report data detected by the plurality of APs, and the detection device is configured to:
obtain data detected by the plurality of APs, wherein data detected by any AP of the plurality of APs comprises load information and radio frequency information of the any AP, received signal strength indicator (RSSI) information between the any AP and a neighbor of the any AP, and load information and radio frequency information of the neighbor of the any AP;
determine a global neighbor topology based on the data detected by the plurality of APs; and
determine an interference source based on the global neighbor topology.

13. An interference source detection device, comprising:
a processor; and
a memory coupled to the processor and configured to store instructions that when executed by the processor, cause the device to be configured to:
obtain data detected by a plurality of access points (Aps), wherein data detected by any AP of the plurality of APs comprises load information and radio frequency information of the any AP, received signal strength indicator RSSI information between the any AP and a neighbor of the any AP, and load information and radio frequency information of the neighbor of the any AP;
determine a global neighbor topology based on the data detected by the plurality of Aps; and
determine an interference source based on the global neighbor topology.

14. The device according to claim 13, wherein when executed by the processor, the instructions further cause the device to:
distinguish between an intranet AP and the interference source in the global neighbor topology based on an intranet AP table, to obtain information about the interference source.

15. The device according to claim 13, wherein when executed by the processor, the instructions further cause the device to:
determine a carrying capacity in a current network status based on the global neighbor topology, wherein the carrying capacity in the current network status is used to indicate a quantity of interference sources that a current network is capable of carrying; and
output an interference source detection result based on the carrying capacity in the current network status and the information about the interference source.

16. The device according to claim 15, wherein when executed by the processor, the instructions further cause the device to:
distinguish between the intranet AP and the interference source in the global neighbor topology based on an intranet AP table, to obtain an intranet AP topology; and
determine the carrying capacity in the current network status based on the intranet AP topology.

17. The device according to claim 15, wherein when executed by the processor, the instructions further cause the device to:
for any interference source, determine, based on information about the any interference source, whether the any interference source is avoidable; and
output the information about the interference source, information about an avoidable interference source, and the carrying capacity in the current network status as the interference source detection result.

18. The device according to claim 17, wherein when executed by the processor, the instructions further cause the device to:
for any interference source $X_i$, calculate an interference degree $D_i$ of the any interference source based on a load of the any interference source and an impact domain of the any interference source by using the following formula:

$$D_i = \Sigma_j \min\{\text{Load}(X_i), \text{Load}(B_{i,j})\}, \text{ wherein}$$

Load($X_i$) is the load of the any interference source $X_i$, and Load($B_{i,j}$) is a load of $B_{i,j}$ in the impact domain of the any interference source $X_i$;
sort interference sources based on interference degrees of the interference sources; and
output the information about the interference source, the information about the avoidable interference source, and the carrying capacity in the current network status based on a sorting result.

19. The device according to claim 17, wherein when executed by the processor, the instructions further cause the device to:
determine an allocatable channel set of a network neighbor of the any interference source based on the information about the any interference source;
sequentially allocate channels in a local topology based on the channel set, wherein the local topology comprises the any interference source and the network neighbor of the any interference source; and
determine, based on each channel allocation result, whether the any interference source is avoidable.

20. The device according to claim 15, wherein when executed by the processor, the instructions further cause the device to:
when a quantity of all interference sources is less than the carrying capacity in the current network status, allocate a radio frequency resource to an intranet AP in the global neighbor topology based on the information about the interference source.

* * * * *